United States Patent
Rivero

(10) Patent No.: US 11,174,083 B1
(45) Date of Patent: Nov. 16, 2021

(54) DUAL LOCKING ASSEMBLY FOR STRAPS

(71) Applicant: Pedro Rivero, Miami, FL (US)

(72) Inventor: Pedro Rivero, Miami, FL (US)

( * ) Notice: Subject to any disclaimer, the term of this patent is extended or adjusted under 35 U.S.C. 154(b) by 0 days.

(21) Appl. No.: 16/867,093

(22) Filed: May 5, 2020

(51) Int. Cl.
*B65D 63/08* (2006.01)
*B65D 63/16* (2006.01)

(52) U.S. Cl.
CPC .............. *B65D 63/08* (2013.01); *B65D 63/16* (2013.01)

(58) Field of Classification Search
CPC ........ B65D 63/08; B65D 63/16; B65D 63/12; B65D 63/14; B65D 63/1036; B65D 63/1072; Y10T 24/1498
See application file for complete search history.

(56) References Cited

U.S. PATENT DOCUMENTS

| | | | |
|---|---|---|---|
| 3,909,884 A * | 10/1975 | Weckesser | F16L 3/233 24/16 PB |
| 4,574,434 A * | 3/1986 | Shupe | B65D 63/14 24/16 PB |
| 4,680,834 A * | 7/1987 | Andre | F16L 3/2336 24/16 PB |
| 4,862,560 A * | 9/1989 | Lichtenberg | B65D 63/16 24/16 PB |
| 4,882,813 A * | 11/1989 | Nakamura | B65D 63/16 24/16 PB |
| 5,121,524 A * | 6/1992 | Mortensen | B65D 63/1036 24/16 PB |
| 5,208,948 A * | 5/1993 | Nirei | B65B 13/345 24/16 PB |
| 5,304,188 A * | 4/1994 | Marogil | A61B 17/12009 24/16 PB |
| 5,802,675 A | 9/1998 | Parsons | |
| 6,230,369 B1 * | 5/2001 | Steadman | F16L 3/233 24/16 PB |
| 6,332,248 B1 | 12/2001 | Daniggelis et al. | |
| 6,530,131 B1 | 3/2003 | Hopkins | |
| 6,532,631 B2 | 3/2003 | Rohaly et al. | |
| 6,640,393 B2 | 11/2003 | Wendle | |
| 6,961,979 B2 | 11/2005 | Wendle | |
| 8,281,461 B2 | 10/2012 | Geiger | |
| 8,578,565 B2 | 11/2013 | Hienekamp | |
| 8,739,387 B1 | 6/2014 | Frishberg | |
| 8,844,881 B2 | 9/2014 | Wes et al. | |
| 8,978,210 B2 | 3/2015 | Arjomand | |
| 8,978,211 B2 | 3/2015 | Arjomand | |

(Continued)

*Primary Examiner* — Robert Sandy
*Assistant Examiner* — Rowland Do
(74) *Attorney, Agent, or Firm* — Albert Bordas, P.A.

(57) ABSTRACT

A dual locking assembly for straps, which has a lock assembly having first and second strap passages positioned opposite each other, and a strap assembly having a strap. The lock assembly and the strap assembly are reusable. The lock assembly is rectangular in shape. The first and second strap passages have first and second locking tabs respectively. The first and second locking tabs are specularly positioned. The strap has first and second ends, and first and second faces, whereby the first face has serrations. The strap assembly is inserted through the lock assembly, whereby a first section of the strap is used to secure an item or a plurality of items while a second section of the strap is cut to be reused. When the strap assembly is inserted through the lock assembly, the serrations are at the outer side of the strap.

10 Claims, 6 Drawing Sheets

(56) References Cited

U.S. PATENT DOCUMENTS

| | | |
|---|---|---|
| 9,073,677 B2 | 7/2015 | Crouse |
| 9,637,291 B2 * | 5/2017 | Montejo ................. B65D 63/16 |
| 9,718,591 B2 | 8/2017 | Lu et al. |
| 10,364,076 B2 | 7/2019 | Seok |
| 10,435,214 B2 | 10/2019 | Kuperus |
| 2008/0083095 A1 * | 4/2008 | Coles ..................... B65D 63/16 24/16 R |
| 2014/0237772 A1 | 8/2014 | Crouse |

* cited by examiner

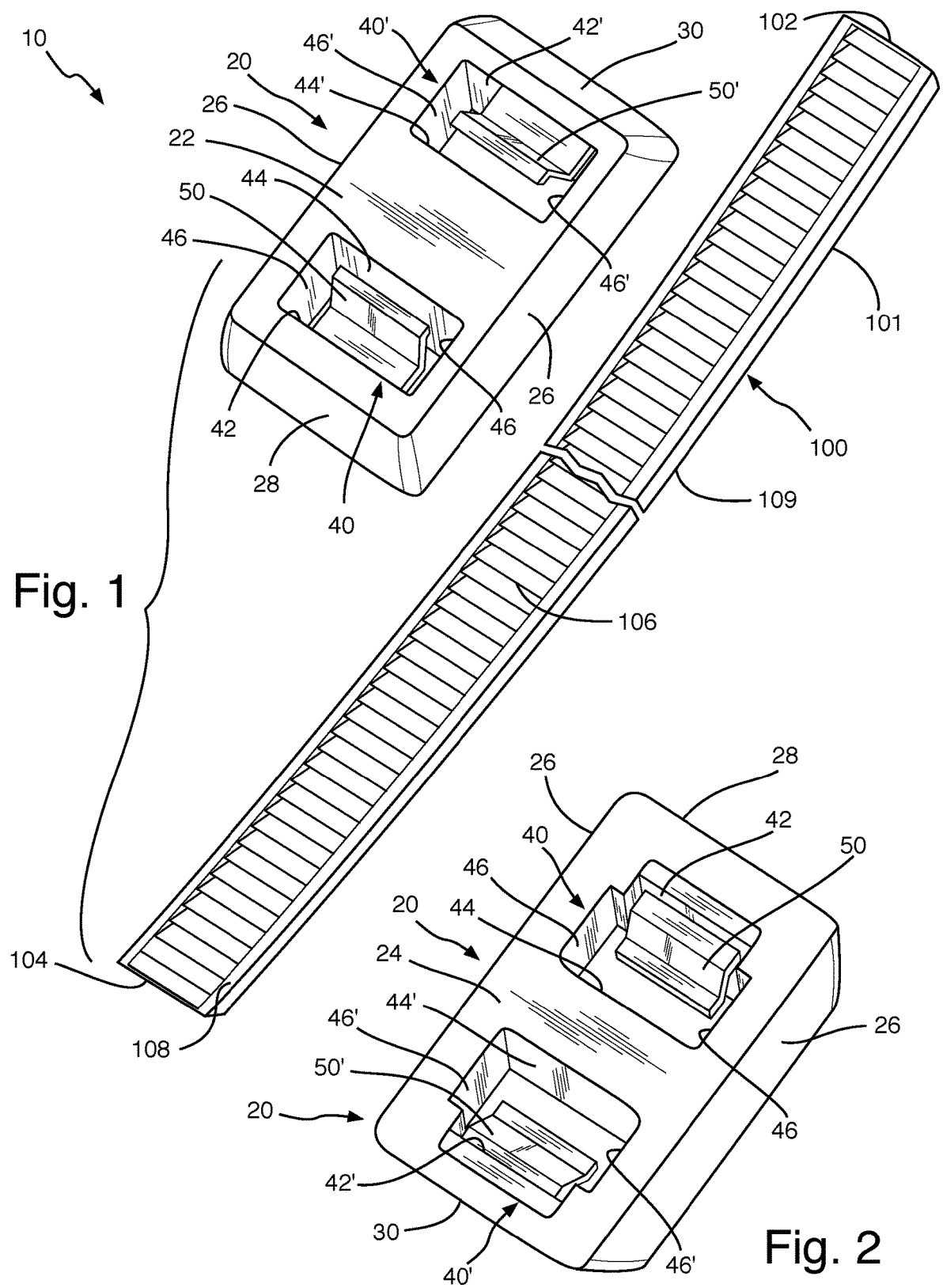

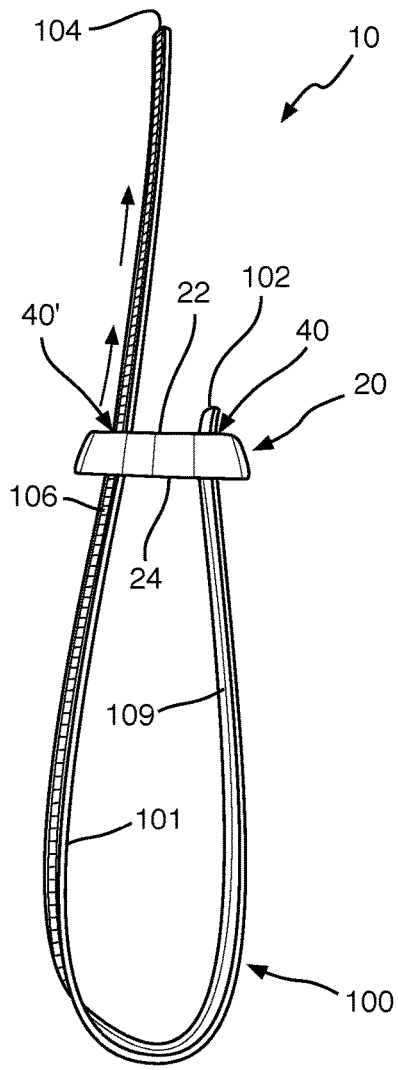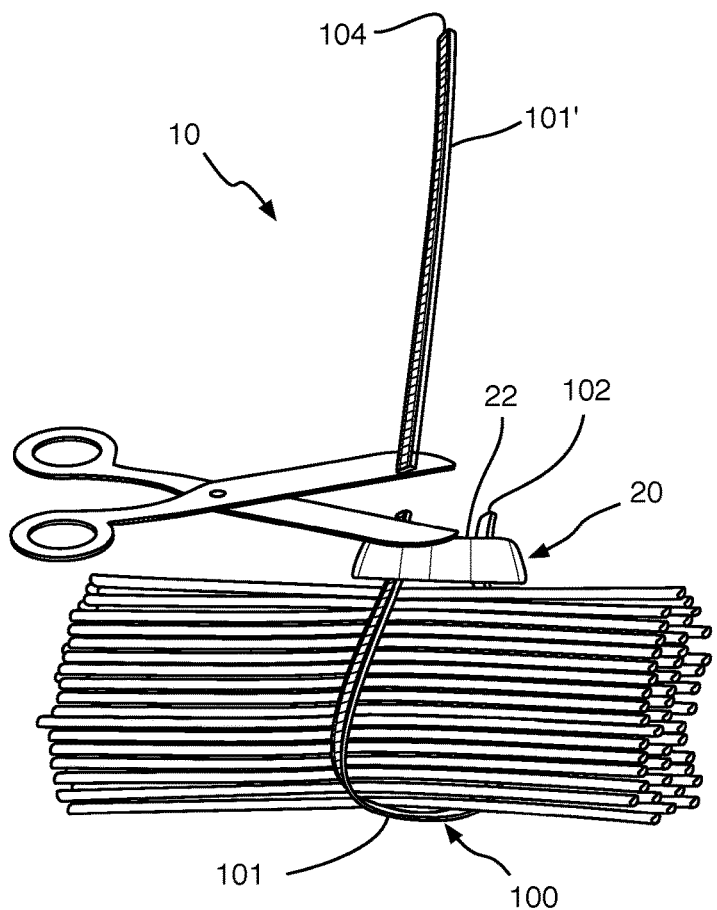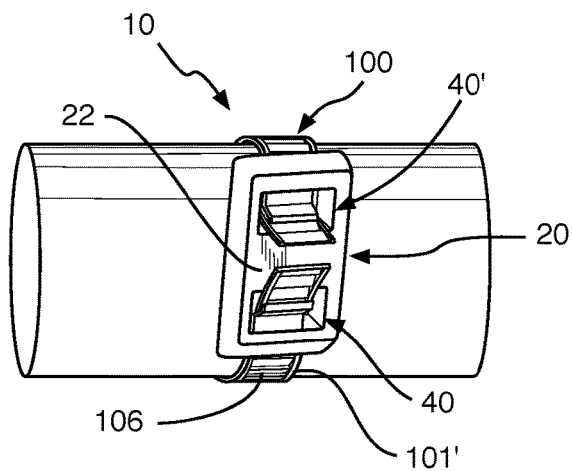
Fig. 3
Fig. 4
Fig. 5

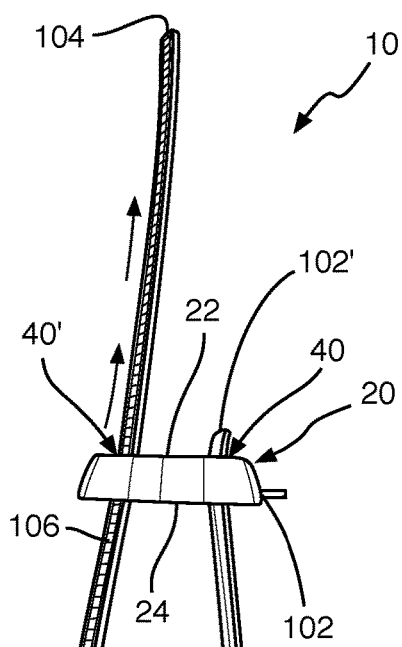
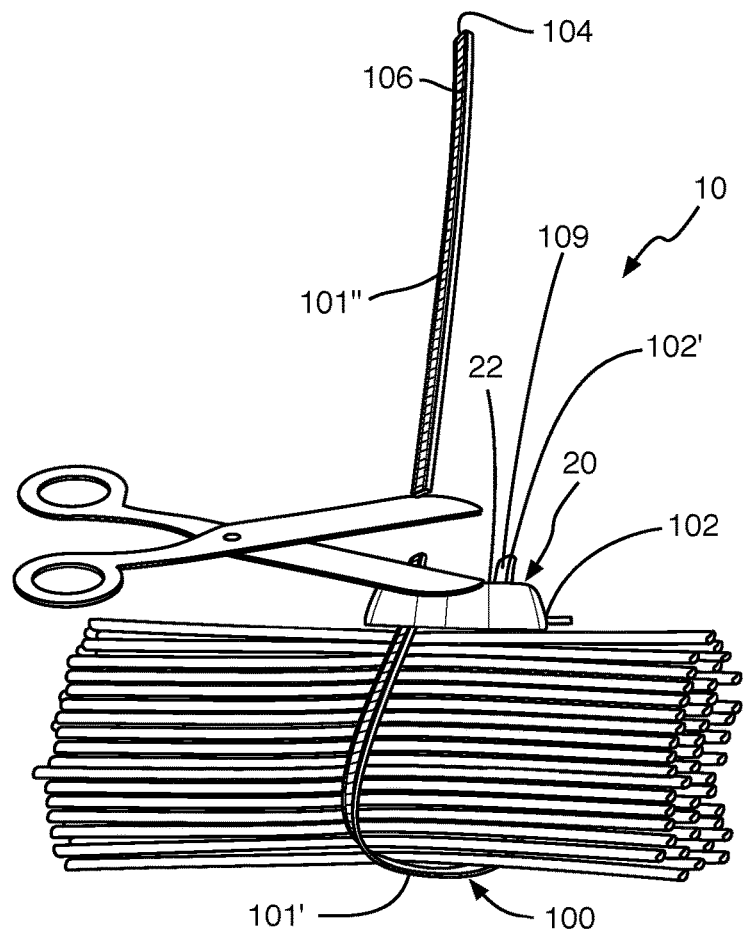
Fig. 11
Fig. 12

DUAL LOCKING ASSEMBLY FOR STRAPS

BACKGROUND OF THE INVENTION

1. Field of the Invention

The present invention relates to locking systems, and more particularly, to dual locking strap assemblies.

2. Description of the Related Art

Applicant believes that one of the closest references corresponds to U.S. Pat. No. 5,802,675 A issued to Parsons on Sep. 8, 1998 for Interlocking cover folding strap disposable restraints. However, it differs from the present invention because Parsons teaches a disposable restraining device having double loops formed of two separate, flexible straps joined together by an interlocking cover. The device is designed to be folded into a compact storage position, which can be carried by law enforcement personnel yet is instantly ready for use. The cover provides a shield for the locking mechanism and additional strength in the area between the two loops. The straps have a core material designed to resist friction cutting and the cover may be constructed of a harder material than the straps for maximum strength.

Applicant believes that another reference corresponds to U.S. Pat. No. 6,332,248 B1 issued to Daniggelis, et al. on Dec. 25, 2001 for Wire harness-bounding method. However, it differs from the present invention because Daniggelis, et al. teach a wire bundle bounding method that meets the requirements of aerospace specifications, as well as a novel cable tie used in the method. The method starts with a bundle of wires and the cable tie. The cable tie has a strap body and a locking head with first and second strap passages. The first and second strap passages each have a pawl that locks in the same direction. The strap body is then wrapped around at least one of the wires and then inserted through the first strap passage. Then the strap body is wrapped around the bundle and then inserted through the second strap passage. The strap body is then tightened and the residual strap portion clipped.

Applicant believes that another reference corresponds to U.S. Pat. No. 6,532,631 B2 issued to Rohaly, et al. on Mar. 18, 2003 for Four piece cable tie. However, it differs from the present invention because Rohaly, et al. teach a cable tie for bundling together a plurality of elongated objects, the cable tie has an elongated flexible strap having opposing ends, a locking head defining a pair of strap passageways, each of the passageways having an inlet end and an outlet end, and a pair of locking devices, each of the pair being mounted to the locking head and at least partially within one of the passageways, the locking devices being configured and oriented relative to the respective passageways so as to permit the ends of the strap to be inserted into the inlet ends of the passageways, and threaded through the passageways, such that the ends emerge from the outlet ends of the passageways, the locking devices being unidirectional so as to prevent the strap ends from being pulled back through the respective passageways in a direction moving from the outlet ends back toward the inlet ends.

Applicant believes that another reference corresponds to U.S. Pat. No. 6,640,393 B2 issued to Wendle on Nov. 4, 2003 for Releasable tie. However, it differs from the present invention because Wendle teaches a releasable tie having an elongated strand of flexible material with a first set of three dimensional beads spaced apart along a first length of the strand. A second set of three dimensional beads formed on the strand are spaced apart along a second length of the strand. A tab formed along the strand has a first locking slot for releasably receiving the first strand length, and a second locking slot for releasably receiving the second length of the strand.

Applicant believes that another reference corresponds to U.S. Pat. No. 6,961,979 B2 issued to Wendle on Nov. 8, 2005 for Bundling tie. However, it differs from the present invention because Wendle teaches a releasable tie having an elongated strand of flexible material with a first set of three dimensional beads spaced apart along a first length of the strand. A second set of three dimensional beads, formed on the strand are spaced apart along a second length of the strand. A tab formed along the strand includes a first locking slot for releasably receiving the first strand length, and a second locking slot for releasably receiving the second length of the strand.

Applicant believes that another reference corresponds to U.S. Pat. No. 6,530,131 B1 issued to Hopkins on Mar. 11, 2003 for Tool leash device. However, it differs from the present invention because Hopkins teaches a tool leash device having at least one coiled leash having a closed loop at one end secured to a split key ring, a snap ring having a selectively opened and closed locking member secured to said split key ring for attachment to a belt loop or the like, a trigger snap connected to the other end of the coiled leash having a selectively opened and closed locking member for securing the same to a closed loop portion of a flexible tie wrap, and a flexible elongated tie wrap having a closed loop portion at one end connected to said trigger snap locking member having a generally smooth end at the other end thereof with a ribbed portion between the ends of said tie wrap and a locking portion on the tie wrap between the ends thereof whereby the smooth end is insertable into the locking portion with the ribbed portion locking into the locking portion for serving a tool thereto.

Applicant believes that another reference corresponds to U.S. Pat. No. 8,281,461 B2 issued to Geiger on Oct. 9, 2012 for Button head tie. However, it differs from the present invention because Geiger teaches a button head tie that has a button head and a tie strap. The button head is a generally flat member having an aperture for receiving the tie strap. The aperture has lead-in ramps to facilitate tie strap insertion and is configured to prevent angled tie strap insertion. The tie strap is a flat elongate member having a wedge that is captured within the aperture. The remainder of the strap passes through the aperture. The wedge and strap have teeth and serrations on both sides, respectively, the teeth and serrations being engageable. In use, the strap is looped around a bundle and inserted into the aperture to either side of the wedge. Strap insertion force is reduced by standoff tabs, which elevate the wedge out of aperture, temporarily, during installation. When loop tension is applied to the bundle, the wedge is pulled into the aperture, compressively locking the strap.

Applicant believes that another reference corresponds to U.S. Pat. No. 8,578,565 B2 issued to Hienekamp on Nov. 12, 2013 for Tightenable clamping device suitable for application in tie wraps. However, it differs from the present invention because Hienekamp teaches a clamping device adapted to receive and retain a portion of a strip, and to actively tighten itself around the strip portion under the influence of a pulling force. This is functioning in such a way that the higher the pulling force, the higher the force with which pushing parts of the clamping device are pushed. This results in a firm clamping connection. On the basis of this functioning, the clamping device can be embodied in a form, which has an open side, while maintaining a high capacity of withstanding loads. This results in the advantageous property that the strip can be placed in and removed from the clamping device in a sideward direction. This allows for detachment and reuse, and increases speed and convenience of use. The strip does not need to be inserted in a closed shape.

Applicant believes that another reference corresponds to U.S. Pat. No. 8,739,387 B1 issued to Frishberg on Jun. 3, 2014 for Reusable cable tie. However, it differs from the present invention because Frishberg teaches a tie and a method for tying at least one object. The tie has a strip, which includes a tip, a connecting end opposite the tip and a plurality of teeth arranged on the strip between the tip and the connecting end, and a plurality of locking members, which are connected to the connecting end of the strip. Each of the locking members includes an opening for passage of the strip therethrough and a locking tab for engaging at least one of the teeth so as to allow the strip to move through the opening of a corresponding one of the locking members only in one direction. The method includes the steps of placing the tie around at least one object passing the strip through the opening of a first one of the locking members in the one direction such that the tie wraps around the at least one object; and disconnecting the first one of the locking members from the connecting end of the strip while leaving at least another one of the locking members connected to the connecting end such that the tie can be reused for tying another object.

Applicant believes that another reference corresponds to U.S. Pat. No. 8,844,881 B2 issued to Wes, et al. on Sep. 30, 2014 for Line routing clip. However, it differs from the present invention because Wes, et al. teach a routing clip for securing a line to a structure comprising a base for attaching the clip to a structure, and a clamp having a first flexible strap, which extends from the base and has one or more projections extending from its side, and a second flexible strap, which extends from the base and has a passageway for receiving the first flexible strap and a locking surface which is arranged to engage one of the projections on the first flexible strap to prevent the first flexible strap from being withdrawn from the passageway. At least part of the clip is made from an elastomeric material.

Applicant believes that another reference corresponds to U.S. Pat. No. 8,978,210 B2 issued to Arjomand on Mar. 17, 2015 for Adjustable-length tie-wrap. However, it differs from the present invention because Arjomand teaches tie-wraps of practically infinite length that can be cut to any desirable size at the time of use. These tie-wraps allow wrapping of any size object and comprise a flexible strap part and a locking part, both of which can be reused numerous times. To use the tie-wrap, the user cuts a piece from the flexible strap bundle and inserts its ends into a locking part and pulls one or both ends of the strap until it is tightly wrapped around the object. In other embodiments the ends of the strap may enter the locking part from one side or from multiple sides. In alternative embodiments the locking part or the strap may have a single pawl or multiple pawls, which are made of plastic, metal, or other materials.

Applicant believes that another reference corresponds to U.S. Pat. No. 8,978,211 B2 issued to Arjomand on Mar. 17, 2015 for Universal adjustable-length tie-wrap. However, it differs from the present invention because Arjomand teaches reusable tie-wraps of arbitrary or unlimited length that can be cut to any desirable size at the time of use. These tie wraps allow wrapping of any size object and include a flexible strap part and a locking part, both of which can be reused numerous times. The tie-wrap strap has flexible pawls, which can bend or can rotate around a hinged base where pawls are attached to the strap. To use the tie-wrap, the user cuts a piece from the flexible strap bundle and inserts its ends into a locking part and pulls one or both ends of the strap until it is tightly wrapped around the object. The ends of the strap may enter the locking part from one side or from multiple sides. Discussed tie-wraps may be used, in addition to wrapping, to form handles or tag holders for the wrapped object.

Applicant believes that another reference corresponds to U.S. Pat. No. 9,073,677 B2 issued to Crouse on Jul. 7, 2015 for Dual head metal locking tie. However, it differs from the present invention because Crouse teaches a metal locking tie having a dual head that secures two different bundles using one tie. The dual head locking tie has a top head, a bottom head, and a tie body. A first end of the tie body attaches to the bottom head and extends through a bottom strap passageway. The tie body wraps around a first bundle, extends through the top strap passageway of the dual head, wraps around a second bundle, and extends back through the bottom strap passageway of the dual head to secure two different bundles.

Applicant believes that another reference corresponds to U.S. Pat. No. 9,718,591 B2 issued to Lu, et al. on Aug. 1, 2017 for Fixing device for a power supply. However, it differs from the present invention because Lu, et al. teach a fixing device that has a fixing member and two fixing belts. The fixing member includes a plate, two fixing portions extending from opposite sides of the plate, and a locking portion located between the two fixing portions. The locking portion includes a locking belt extending from the plate and a connecting portion extending from the plate. The locking belt is locked to the connecting portion to form a locking loop. The two fixing belts are fixed to the two fixing portions.

Applicant believes that another reference corresponds to U.S. Pat. No. 10,364,076 B2 issued to Seok on Jul. 30, 2019 for Cable tie. However, it differs from the present invention because Seok teaches a cable tie including a tie band, which is formed in a shape of a strap to bind cables, and with a plurality of serrated grooves continuously formed on a one surface thereof in a longitudinal direction, and a tie holder which is connected to one end of the tie band and includes a tie band passage, through which the other end of the tie band passes, and a serrated locking protrusion formed on an inner surface of the tie band passage and interference-latched to the serrated grooves. The tie band is provided with a cut guide groove formed on one or both widthwise edges thereof, so that a free end of the tie band remaining when the tie band binds the cables together is cut off by a rotating force generated when the free end is twisted, without using a cutting tool.

Applicant believes that another reference corresponds to U.S. Pat. No. 10,435,214 B2 issued to Kuperus on Oct. 8, 2019 for Tie-wrap assembly and method for using the same. However, it differs from the present invention because Kuperus teaches a tie-wrap assembly having a locking head, an elongated strap body spaced apart from the locking head, and a coupling member, wherein the coupling member is connected to and disposed between the locking head and the elongated strap body, and wherein the coupling member is fabricated from an elastomeric material.

Applicant believes that another reference corresponds to U.S. Patent Application Publication No. 2014/0237772 A1, published on Aug. 28, 2014 to Andrew Crouse for Dual Head Metal Locking Tie. However, it differs from the present invention because Crouse teaches a metal locking tie having a dual head that secures two different bundles using one tie. The dual head locking tie has a top head, a bottom head, and a tie body. A first end of the tie body attaches to the bottom head and extends through a bottom strap passageway. The tie body wraps around a first bundle, extends through the top strap passageway of the dual head, wraps around a second bundle, and extends back through the bottom strap passageway of the dual head to secure two different bundles.

Other patents describing the closest subject matter provide for a number of more or less complicated features that fail to solve the problem in an efficient and economical way. None of these patents suggest the novel features of the present invention.

SUMMARY OF THE INVENTION

The present invention is a dual locking assembly for straps comprising a lock assembly having first and second strap passages positioned opposite each other, and a strap assembly having an strap, wherein the lock assembly and the strap assembly are reusable.

The lock assembly comprises an upper face and a lower face. The lock assembly further comprises first and second longitudinal walls and first and second transversal walls. The lock assembly is rectangular in shape. The first and second strap passages each extend from the upper face to the lower face. The first strap passage is defined by a first inner end face, a first inner face, and first inner lateral faces. The second strap passage is defined by a second inner end face, a second inner face, and second inner lateral faces. The first and second strap passages further comprises first and second locking tabs respectively. The first and second locking tabs are specularly positioned. The first and second locking tabs extend from the first and second inner end faces respectively.

The strap comprises first and second ends, and first and second faces, whereby the first face comprises serrations. The lock assembly and the strap assembly are two independent pieces. The strap assembly is inserted through the lock assembly, whereby a first section of the strap is used to secure an item or a plurality of items, while an unused remaining section of the strap is cut to be reused. When the strap assembly is inserted through the lock assembly, the serrations face outwardly on the strap, whereby the serrations are facing respective first and second locking tabs to engage, and lock the strap at a predetermined section. The first end of the strap passes through the first strap passage from the lower face to the upper face, whereby a section or stud protrudes from the upper face, and the second end of the strap is pulled through the second strap passage from the lower face to the upper face, whereby a second section of the strap protrudes from the upper face. An unused section of the second section of the strap is cut to be reused with another lock assembly. The lock assembly is reused whereby the first section of the strap is cut at the lower face, the sections protruding from the upper face are removed, and the lock assembly is free to be reused.

In a second embodiment, the strap assembly is attached to the lock assembly, whereby the first end of the strap extends from the first transversal wall. The first end of the strap extends from the first transversal wall and the second end of the strap is pulled through the second strap passage from the lower face to the upper face. The strap section protruding from the upper face is cut to be reused. The strap is also reusable, whereby the strap is cut close to the first end, and a cut end is inserted through the first strap passage while the second end protrude from the second strap passage.

It is therefore one of the main objects of the present invention to provide a dual locking assembly for straps.

It is another object of this invention to provide a dual locking assembly for straps having a strap assembly and a lock assembly.

It is another object of this invention to provide a dual locking assembly for straps wherein the strap assembly and the lock assembly are separated.

It is another object of this invention to provide a dual locking assembly for straps wherein both strap assembly and lock assembly are reusable.

It is another object of this invention to provide a dual locking assembly for straps that is volumetrically efficient for carrying, transporting, and storage.

It is another object of this invention to provide a dual locking assembly for straps that can be readily assembled and disassembled without the need of any special tools.

It is another object of this invention to provide a dual locking assembly for straps, which is of a durable and reliable construction.

It is yet another object of this invention to provide a dual locking assembly for straps that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an isometric view of a first embodiment of the present invention having a lock assembly and a strap assembly separated.

FIG. 2 is a bottom isometric view of the first embodiment lock assembly.

FIG. 3 is a side view of the first embodiment of the present invention demonstrating how the strap assembly engages with the lock assembly.

FIG. 4 is an isometric view of the first embodiment of the present invention securing a plurality of items and cutting an unused remaining section of the strap assembly for reuse.

FIG. 5 is an isometric view of the first embodiment of the present invention securing an object with the unused remaining section that was previously cut in FIG. 4 with another lock assembly.

FIG. 11 is a side view of the second embodiment of the present invention, demonstrating how a reused strap assembly engages with a reused lock assembly.

FIG. 12 is an isometric view of the second embodiment of the present invention, securing a plurality of items with a reused strap assembly and a reused lock assembly, and cutting again an unused remaining section of the strap assembly for reuse.

DETAILED DESCRIPTION OF THE PREFERRED EMBODIMENT

Figure 6:
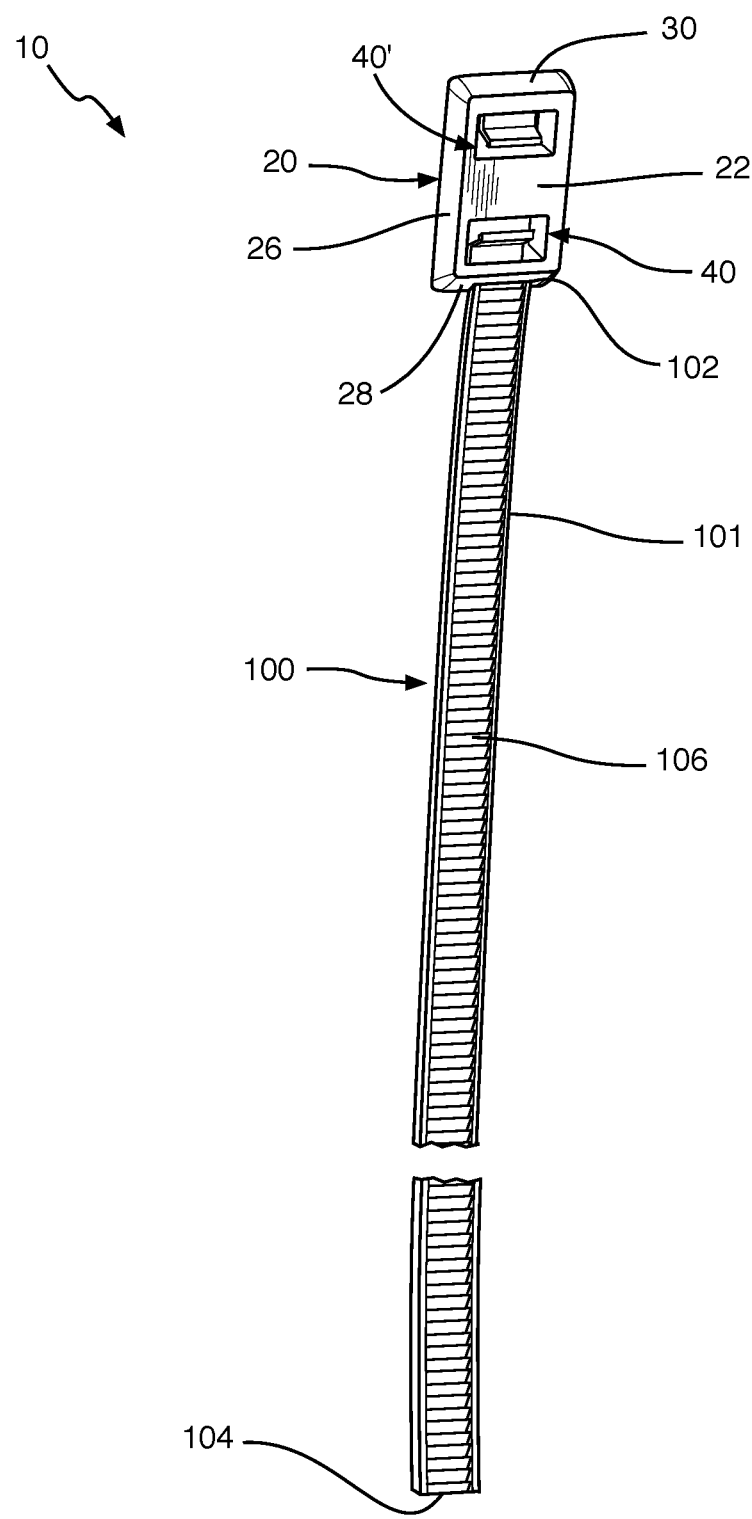
FIG. 6 is an isometric view of a second embodiment of the present invention in which the strap assembly extends from the lock assembly.

Referring now to the drawings, the present invention is a dual locking assembly for straps, and is generally referred to with numeral 10. It can be observed that it basically includes lock assembly 20 and strap assembly 100.

Seen in FIGS. 1-5 is a first embodiment of present invention 10. Lock assembly 20 comprises first strap passage 40 and second strap passage 40'. Lock assembly 20 and strap 100 are reusable. In a preferred embodiment, lock assembly 20 and strap assembly 100 are two independent components, and lock assembly 20 is rectangular in shape. Strap assembly 100 comprises strap 101. Strap 101 comprises first end 102, second end 104, first face 108, and second face 109. First face 108 has serrations 106.

As seen in FIGS. 1 and 2, lock assembly 20 comprises upper face 22 and lower face 24. Lock assembly 20 further comprises first and second longitudinal walls 26, transversal wall 28, and transversal wall 30. First strap passage 40 and second strap passage 40' each extends from upper face 22 to lower face 24. First strap passage 40 is defined by inner end face 42, inner face 44, and inner lateral faces 46. First strap passage 40 further comprises first locking tab 50. Second strap passage 40' is defined by inner end face 42', inner face 44', and inner longitudinal faces 46'. Second strap passage 40' further comprises second locking tab 50'. First locking tab 50 extends from first inner end face 42, and second locking tab 50' extends from second inner end face 42'. Locking tabs 50 and 50' are mirror images of each other, or specularly positioned.

As seen in FIG. 3, strap assembly 100 is inserted through lock assembly 20. First end 102 of strap 101 passes through first strap passage 40 from lower face 24 to upper face 22, whereby a first section, end 102, protrudes from upper face 22 to define a stub. Second end 104 of strap 101 is pulled through second strap passage 40' from lower face 24 to upper face 22, defining a second section of strap 101 that protrudes from upper face 22. When strap assembly 100 is inserted through lock assembly 20, serrations 106 face outwardly on strap 101, whereby serrations 106 face respective first and second locking tabs 50 and 50', seen in FIG. 1, to engage and lock strap 101 at predetermined sections.

As seen in FIG. 4, a first section of strap 101 is used to secure an item or a plurality of items. An unused remaining section of strap 101, protruding from upper face 22, is cut to be reused as strap section 101'.

As seen in FIG. 5, strap section 101' from FIG. 4 is then used to secure an item or a plurality of items with another lock assembly 20. This process may be repeated over and over until strap assembly 100 becomes too short to reuse. In addition, lock assembly 20 may also be reused, whereby a section of strap 101 is cut, at one or both sides of lower face 24, the stud(s) or remaining strap section 101' protruding from upper face 22 are removed, and lock assembly 20 is free to be reused.

Figure 7:
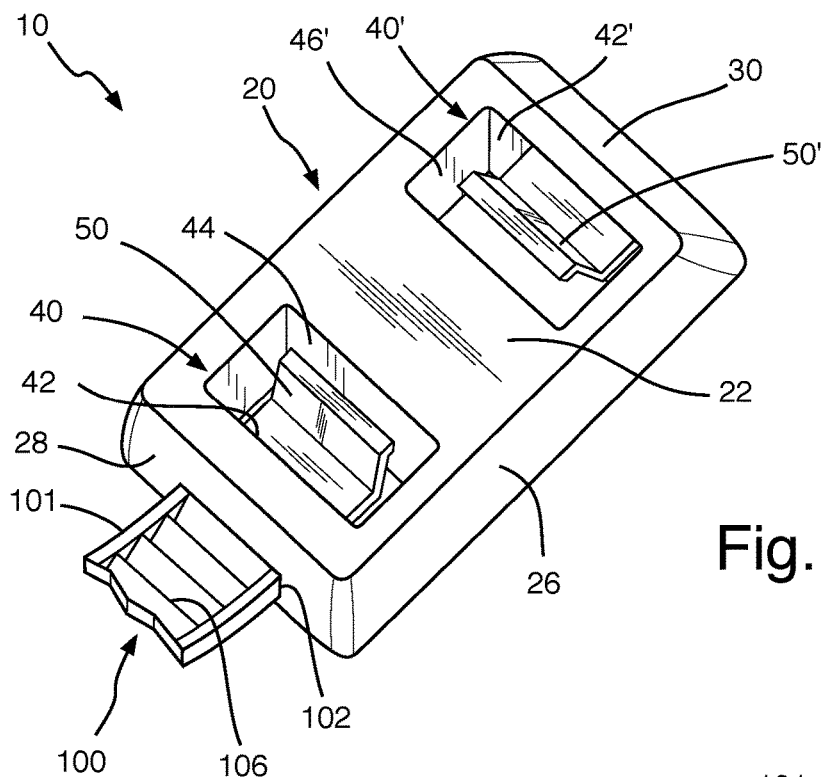
FIG. 7 is a top isometric view of the second embodiment lock assembly with the strap assembly extending therefrom.
Figure 8:
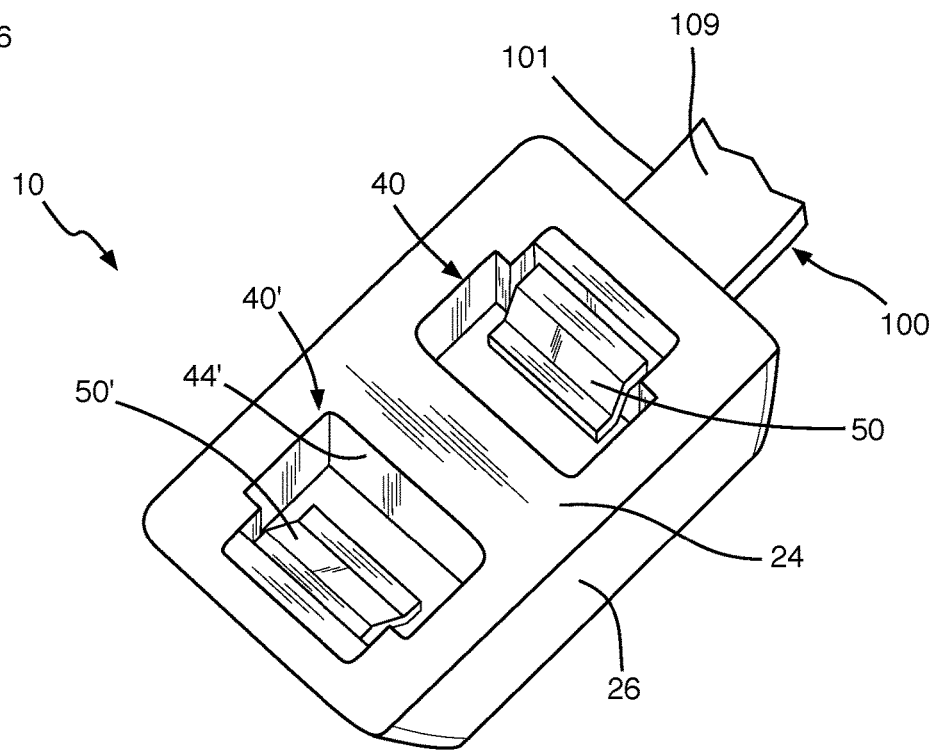
FIG. 8 is bottom isometric view of the second embodiment lock assembly with the strap assembly extending therefrom.

Seen in FIGS. 6-12 is a second embodiment of present invention 10. As seen in FIGS. 6, 7 and 8, strap assembly 100 is attached to lock assembly 20, whereby end 102 extends from transversal wall 28. Similarly, lock assembly 20 comprises upper face 22 and lower face 24. Lock assembly 20 further comprises first and second longitudinal walls 26, transversal wall 28, and transversal wall 30. First strap passage 40 and second strap passage 40' each extends from upper face 22 to lower face 24. First strap passage 40 is defined by inner end face 42, inner face 44, and inner lateral faces 46. First strap passage 40 further comprises first locking tab 50. Second strap passage 40' is defined by inner end face 42', inner face 44', and inner longitudinal faces 46'. Second strap passage 40' further comprises second locking tab 50'. First locking tab 50 extends from first inner end face 42, and second locking tab 50' extends from second inner end face 42'. Locking tabs 50 and 50' are mirror images of each other, or specularly positioned. A first section of strap 101 is used to secure an item or a plurality of items, whereby second end 104 of strap 101 is pulled through second strap passage 40' from lower face 24 to upper face 22. An unused remaining section of strap 101, protruding from upper face 22, is cut to be reused as strap section 101', as seen in FIG. 11.

Figure 9:
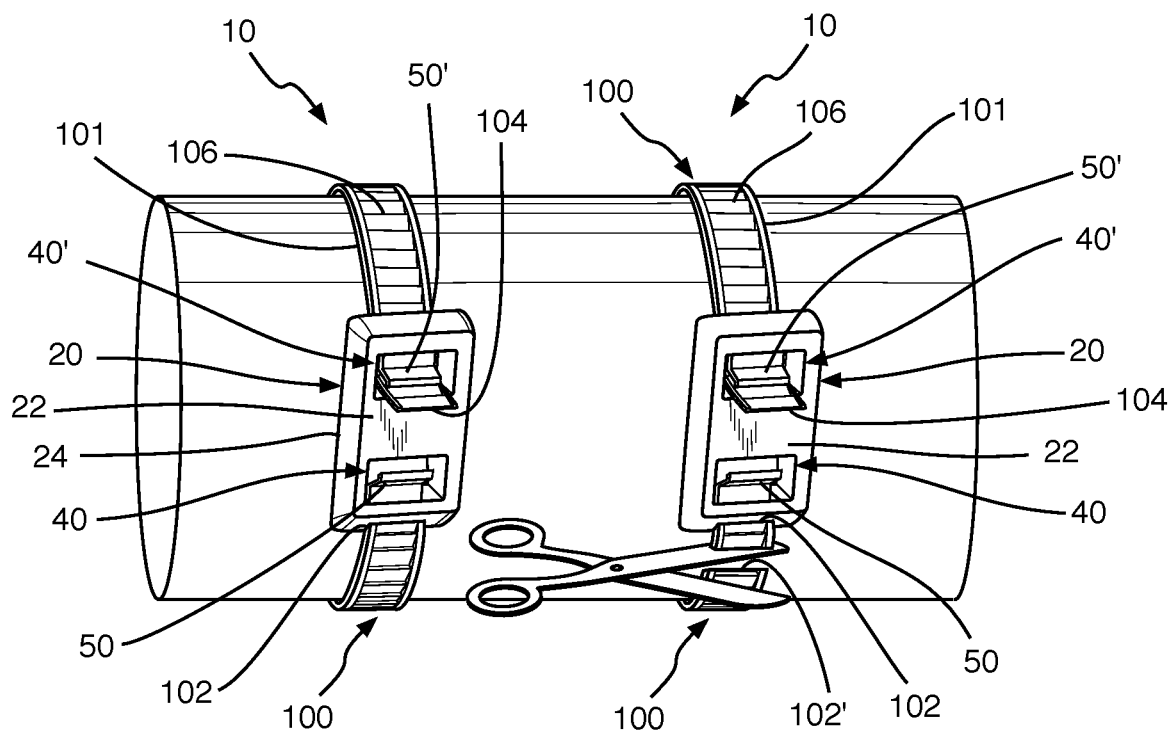
FIG. 9 is an isometric view of two second embodiment of the present invention, securing an object and one being cut at its strap to reuse.

As seen in FIG. 9, strap 101 is reusable, whereby strap 101 as illustrated on the right side, is cut close to first end 102.

Figure 10:
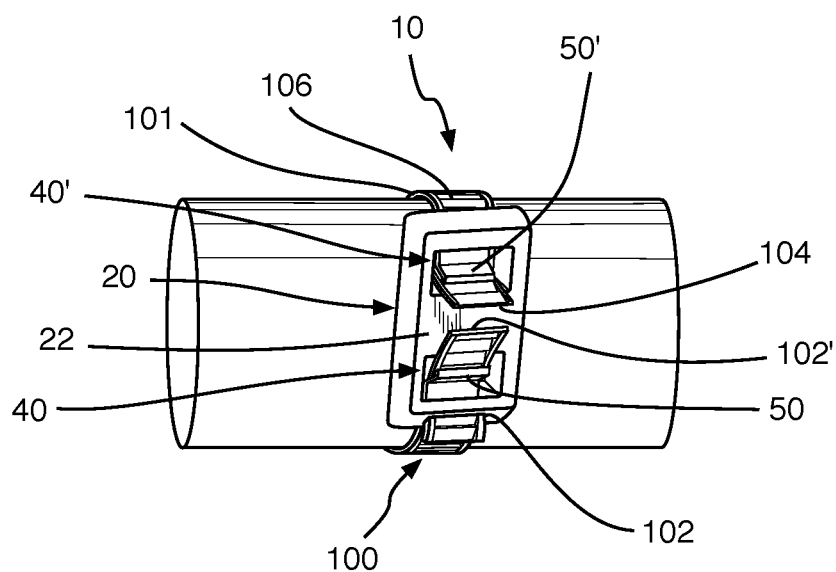
FIG. 10 is an isometric view of the second embodiment of the present invention, reusing the strap assembly cut in FIG. 9 with another object having a smaller diameter.

As seen in FIG. 10, cut end 102', from FIG. 9, is inserted through first strap passage 40 while second end 104 protrudes from second strap passage 40'. Once used as illustrated in FIG. 10, lock assembly 20 and strap 101 may again be reused, whereby strap 101 is cut close to lower face 24 and strap 101 is removed from lock assembly 20. Then a remaining section of strap 101 is free to be reused with the same or another lock assembly 20 onto another item or plurality of items, having a smaller diameter than the first item or plurality of items previously secured. This process may be repeated over and over until strap assembly 100 becomes too short to reuse.

As seen in FIGS. 11 and 12, strap section 101' is reused with a reused lock assembly 20, whereby cut end 102' is inserted through first strap passage 40 while second end 104 protrudes from second strap passage 40'. An unused remaining section of strap section 101', protruding from upper face 22, may also be cut to be reused, as strap section 101". Strap section 101" may be reused with other reused lock assemblies 20. This process may be repeated over and over until strap assembly 100 becomes too short to reuse.

In addition, it is noted that in alternate first and second embodiments of present invention 10, lock assembly 20 consists of first strap passage 40 and second strap passage 40', whereby lock assembly 20 consists of upper face 22 and lower face 24. Lock assembly 20 further consists of first and second longitudinal walls 26, transversal wall 28, and transversal wall 30. First strap passage 40 and second strap passage 40' each extends from upper face 22 to lower face 24. First strap passage 40 is defined by inner end face 42, inner face 44, and inner lateral faces 46. First strap passage 40 further consists of first locking tab 50. Second strap passage 40' is defined by inner end face 42', inner face 44', and inner longitudinal faces 46'. Second strap passage 40' further consists of second locking tab 50'. First locking tab 50 extends from first inner end face 42, and second locking tab 50' extends from second inner end face 42'. Locking tabs 50 and 50' are mirror images of each other, or specularly positioned. Furthermore, strap assembly 100 consists of strap 101. Strap 101 consists of first end 102, second end 104, first face 108, and second face 109. First face 108 has serrations 106.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dual locking assembly for straps comprising:
   A) a lock assembly having first and second strap passages positioned opposite each other, said lock assembly comprises an upper face and a lower face, said lock assembly further comprises first and second longitudinal walls, and first and second transversal walls, said first and second strap passages each extend from said upper face to said lower face, said first and second strap passages further comprise first and second locking tabs respectively; and
   B) a strap assembly comprising a strap, wherein said lock assembly and said strap assembly are adapted to be reusable, said strap comprises first and second ends, and first and second faces, whereby said first face comprises serrations, said strap assembly is attached to said lock assembly, whereby said first end of said strap extends from said first transversal wall, and said second end of said strap is adapted to be pulled through said second strap passage from said lower face to said upper face on a first use, after said first use, a first section of said strap is cut at said first end and removed from said lock assembly, and said cut first section is adapted to be reused by being passed through said first strap passage from said lower face to said upper face, said serrations are adapted to face outwardly on said strap when said strap assembly is inserted through said lock assembly, whereby said serrations are adapted to be facing respective first and second locking tabs to engage and lock said strap at a predetermined section.

2. The dual locking assembly for straps set forth in claim 1, further characterized in that said lock assembly is rectangular in shape.

3. The dual locking assembly for straps set forth in claim 1, further characterized in that said first strap passage is defined by a first inner end face, a first inner face, and first inner lateral faces.

4. The dual locking assembly for straps set forth in claim 3, further characterized in that said second strap passage is defined by a second inner end face, a second inner face, and second inner lateral faces.

5. The dual locking assembly for straps set forth in claim 4, further characterized in that said first and second locking tabs are specularly positioned.

6. The dual locking assembly for straps set forth in claim 5, further characterized in that said first and second locking tabs extend from said first and second inner end faces respectively.

7. The dual locking assembly for straps set forth in claim 6, further characterized in that said lock assembly and said strap assembly are separate after said first use.

8. The dual locking assembly for straps set forth in claim 1, further characterized in that said strap assembly is adapted to be inserted through said lock assembly, whereby said first section of said strap is used to secure an item or a plurality of items, while an unused remaining section of said strap is cut to be reused.

9. The dual locking assembly for straps set forth in claim 8, further characterized in that said first end of said strap is adapted to pass through said first strap passage from said lower face to said upper face, and said second end of said strap is adapted to be pulled through said second strap passage from said lower face to said upper face, whereby a second section of said strap protrudes from said upper face.

10. The dual locking assembly for straps set forth in claim 9, further characterized in that an unused section of said second section is adapted to be cut and reused with another said lock assembly.

* * * * *